US00RE47749E

(19) United States
(12) Reissued Patent
Akahane et al.

(10) Patent Number: US RE47,749 E
(45) Date of Reissued Patent: Dec. 3, 2019

(54) LIQUID-EJECTING HEAD AND LIQUID-EJECTING APPARATUS

(71) Applicant: SEIKO EPSON CORPORATION, Tokyo (JP)

(72) Inventors: Fujio Akahane, Azumino (JP); Tomoaki Takahashi, Matsumoto (JP)

(73) Assignee: Seiko Epson Corporation, Tokyo (JP)

(21) Appl. No.: 15/366,512

(22) Filed: Dec. 1, 2016

Related U.S. Patent Documents

Reissue of:
(64) Patent No.: 8,899,724
Issued: Dec. 2, 2014
Appl. No.: 13/347,564
Filed: Jan. 10, 2012

(30) Foreign Application Priority Data

Jan. 11, 2011 (JP) ..... 2011-003490

(51) Int. Cl.
*B41J 2/14* (2006.01)

(52) U.S. Cl.
CPC .. *B41J 2/14233* (2013.01); *B41J 2002/14491* (2013.01); *B41J 2202/12* (2013.01)

(58) Field of Classification Search
CPC ..... B41J 2202/12; B41J 2002/14491; B41J 2/14233
USPC ..... 347/47, 44, 65, 20, 40, 89
See application file for complete search history.

(56) References Cited

U.S. PATENT DOCUMENTS 4,680,595 A * 7/1987 Cruz-Uribe ..... B41J 2/14233 347/40
4,730,197 A * 3/1988 Raman ..... B41J 2/14233 347/10
5,087,931 A * 2/1992 Rawson ..... 347/46
5,455,615 A 10/1995 Burr et al.
5,677,718 A 10/1997 Crawford et al.
5,748,214 A * 5/1998 Usui et al. ..... B41J 2/14233 347/40
6,022,100 A * 2/2000 Takenouchi et al. ..... 347/65
7,344,229 B2 * 3/2008 Ito et al. ..... 347/71
7,806,515 B2 * 10/2010 Harvey et al. ..... 347/65
(Continued)

FOREIGN PATENT DOCUMENTS

JP 6-115087 4/1994
JP 06-143601 5/1994
(Continued)

*Primary Examiner* — Minh Nguyen

(74) *Attorney, Agent, or Firm* — Workman Nydegger

(57) ABSTRACT

A liquid-ejecting head includes a nozzle plate having a nozzle opening that serves for liquid ejection; a channel-forming substrate including pressure-generating chambers that are in communication with the nozzle opening; a pressure generator that serves to generate pressure change in a liquid in the pressure-generating chambers; and a communication plate provided between the nozzle plate and the channel-forming substrate, the communication plate having a communication channel that forms a communication between the pressure-generating chambers and the nozzle opening. The communication plate has a circulation channel that is in communication with a common liquid chamber through the communication channel, the common liquid chamber being in communication with a plurality of the pressure-generating chambers in common.

30 Claims, 11 Drawing Sheets

(56) References Cited

U.S. PATENT DOCUMENTS

| | | | | |
|---|---|---|---|---|
| 8,201,934 | B2 | 6/2012 | Kawakami et al. | |
| 2011/0148988 | A1* | 6/2011 | Hoisington et al. | 347/54 |

FOREIGN PATENT DOCUMENTS

| | | | | |
|---|---|---|---|---|
| JP | 3161095 | | 2/2001 | |
| JP | 2006-088493 | | 4/2006 | |
| JP | 2009-143168 | | 7/2009 | |
| JP | 2009-196220 | | 9/2009 | |
| JP | 2009247938 | * | 10/2009 | B05C 5/00 |
| JP | 2010-082900 | | 4/2010 | |
| JP | 2010-094864 | | 4/2010 | |

* cited by examiner

LIQUID-EJECTING HEAD AND LIQUID-EJECTING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Reissue application of U.S. patent application Ser. No. 13/347,564, filed Jan. 10, 2012, now U.S. Pat. No. 8,899,724, which issued on Dec. 2, 2014 and claims priority to Japanese Patent Application No. 2011-003490, filed Jan. 11, 2011.*

This application claims a priority to Japanese Patent Application No. 2011-003490 filed on Jan. 11, 2011 which is hereby expressly incorporated by reference herein in its entirety.

BACKGROUND

1. Technical Field

The present invention relates to a liquid-ejecting head having a nozzle opening from which a liquid is ejected and relates to a liquid-ejecting apparatus. The invention especially relates to an ink jet recording head and ink jet recording apparatus in which ink is ejected as the liquid.

2. Related Art

An ink jet recording head is one of typical examples of a liquid-ejecting head from which an ink droplet are ejected. Examples of the ink jet recording head include a recording head which includes a channel-forming substrate having a pressure-generating chamber and a piezoelectric actuator provided on one surface of the channel-forming substrate. In such a recording head, the piezoelectric actuator is deformed to apply pressure to the inside of the pressure-generating chamber, thereby ejecting an ink droplet from a nozzle opening.

In such an ink jet recording head, components contained in an ink evaporate from the nozzle opening, thereby increasing the viscosity of the ink. Variation is therefore caused in quality of ejection of an ink droplet with the passage of time, and the quality of ink ejection cannot be accordingly uniformly maintained. In addition, components contained in ink precipitate with the result that difference is generated between components contained in a continuously ejected ink droplet and components contained in an intermittently ejected ink droplet. Variation is therefore also caused in quality of liquid ejection.

An ink jet recording head is therefore proposed (for example, JP-A-2009-247938 and Japanese Patent No. 3161095), in which a plurality of pressure-generating chambers are in communication with a common liquid chamber in common, ink is supplied to the common liquid chamber and is subsequently retrieved from the common liquid chamber, and the supplying and retrieving are repeated with the result the ink is circulated, thereby suppressing the increase of ink viscosity and deposition of components contained in the ink.

Even in the case where the ink stored in the common liquid chamber, which is in communication with a plurality of the pressure-generating chambers in common, is circulated as described in JP-A-2009-247938 and Japanese Patent No. 3161095, unfortunately, the viscosity of ink which has been fed to the vicinity of the nozzle opening immediately before being ejected as an ink droplet cannot be prevented from being problematically increased, and deposition of components contained in the ink cannot be sufficiently suppressed. The quality of liquid ejection is therefore disadvantageously decreased.

Such disadvantages arise not only in the ink jet recording head from which ink is ejected but in a liquid-ejecting head from which liquids other than the ink are ejected.

SUMMARY

An advantage of some aspects of the invention is that it provides a liquid-ejecting head and liquid-ejecting apparatus which can serve to steadily suppress the increase of liquid viscosity and deposition of components contained in the liquid and which enable the quality of liquid ejection to be increased.

According to a first aspect of the invention, there is provided a liquid-ejecting head including: a nozzle plate having a nozzle opening that serves for liquid ejection; a channel-forming substrate including pressure-generating chambers that are in communication with the nozzle opening; a pressure generator that serves to generate pressure change in liquid in the pressure-generating chambers; and a communication plate that is provided between the nozzle plate and the channel-forming substrate, the communication plate having a communication channel that forms a communication between the pressure-generating chamber and the nozzle opening. The communication plate has a circulation channel that is in communication with a common liquid chamber through the communication channel, the common liquid chamber being in communication with a plurality of the pressure-generating chambers in common.

In such a liquid-ejecting head, the communication plate having the communication channel and the circulation channel is provided, and a liquid in the vicinity of the nozzle opening can be therefore circulated through the channel positioned adjacent to the nozzle opening relative to the pressure-generating chamber. A liquid immediately before being ejected as a droplet can be accordingly steadily prevented from being dried, and deposition of components contained in the liquid can be also steadily suppressed. In addition, the channels individually having various functions, such as the communication channel and circulation channel, are formed in the communication plate, thereby being able to impart simple structures to the channels of the nozzle plate and channel-forming substrate. The sizes of the nozzle plate and channel-forming substrate can be therefore reduced, and yields of the nozzle plate and channel-forming substrate can be accordingly increased with the result that production costs can be reduced.

It is preferable that the channel-forming substrate has at least two lines of the pressure-generating chambers aligned in parallel and that the circulation channel serves as a liquid chamber that is in communication with each of the two lines of the pressure-generating chambers. By virtue of such a configuration, liquids in the two lines of the pressure-generating chambers can be circulated through a single circulation channel, and a simple structure can be provided with the result that production costs can be reduced.

It is preferable that the channel-forming substrate has a plurality of lines of the pressure-generating chambers aligned in parallel and that the individual lines of the pressure-generating chambers are independently in communication with the corresponding circulation channels. By virtue of such a configuration, various types of liquids can be individually supplied to the corresponding pressure-generating chambers and can be then ejected.

It is preferable that the channel-forming substrate has an expansion portion that is in combination with the circulation channel to increase the cross-sectional area of the circulation channel. By virtue of such a configuration, the cross-sectional area of the circulation channel can be increased, thereby being able to enhance circulation characteristics.

It is preferable that the circulation channel is positioned so as to overlap the pressure-generating chamber in a direction in which the channel-forming substrate and the communication plate are stacked. By virtue of such a configuration, the cross-sectional area of the circulation channel can be increased, thereby being able to enhance circulation characteristics.

It is preferable that the circulation channel has a narrow portion including a first wall and a second wall, the first wall tilting with respect to a flow direction in which a liquid circulates from the pressure-generating chamber to the common liquid chamber and serving to gradually decrease the cross-sectional area of the circulation channel toward the downstream side, the second wall tilting with respect to the flow direction and serving to gradually increase the cross-sectional area that has been gradually decreased by the first wall. In addition, the tilt angle of the first wall with respect to the inner surface of the circulation channel at the upstream side relative to the first wall is larger than the tilt angle of the second wall with respect to the inner surface of the circulation channel at the downstream side relative to the second wall. By virtue of such a configuration, formation of the narrow portion enables a difference in channel resistance to be generated between a forward direction in which a liquid flowing the circulation channel circulates from the pressure-generating chamber to a manifold and a direction opposite thereto. A liquid can be therefore circulated only as a result of generating pressure change in the liquid in the pressure-generating chamber by the pressure generator, and use of an additional unit such as a pump is accordingly excluded with the result that production costs can be reduced.

It is preferable that a plurality of the narrow portions are provided. By virtue of such a configuration, the difference (ratio) in the channel resistance can be increased between the forward direction and the opposite direction.

It is preferable that the first wall has a curved surface.

According to a second aspect of the invention, there is provided a liquid-ejecting apparatus including the liquid-ejecting head having any one of the above advantages.

Such a liquid-ejecting apparatus enables the quality of liquid ejection to be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be hereinafter described in detail.

First Embodiment

Figure 1:
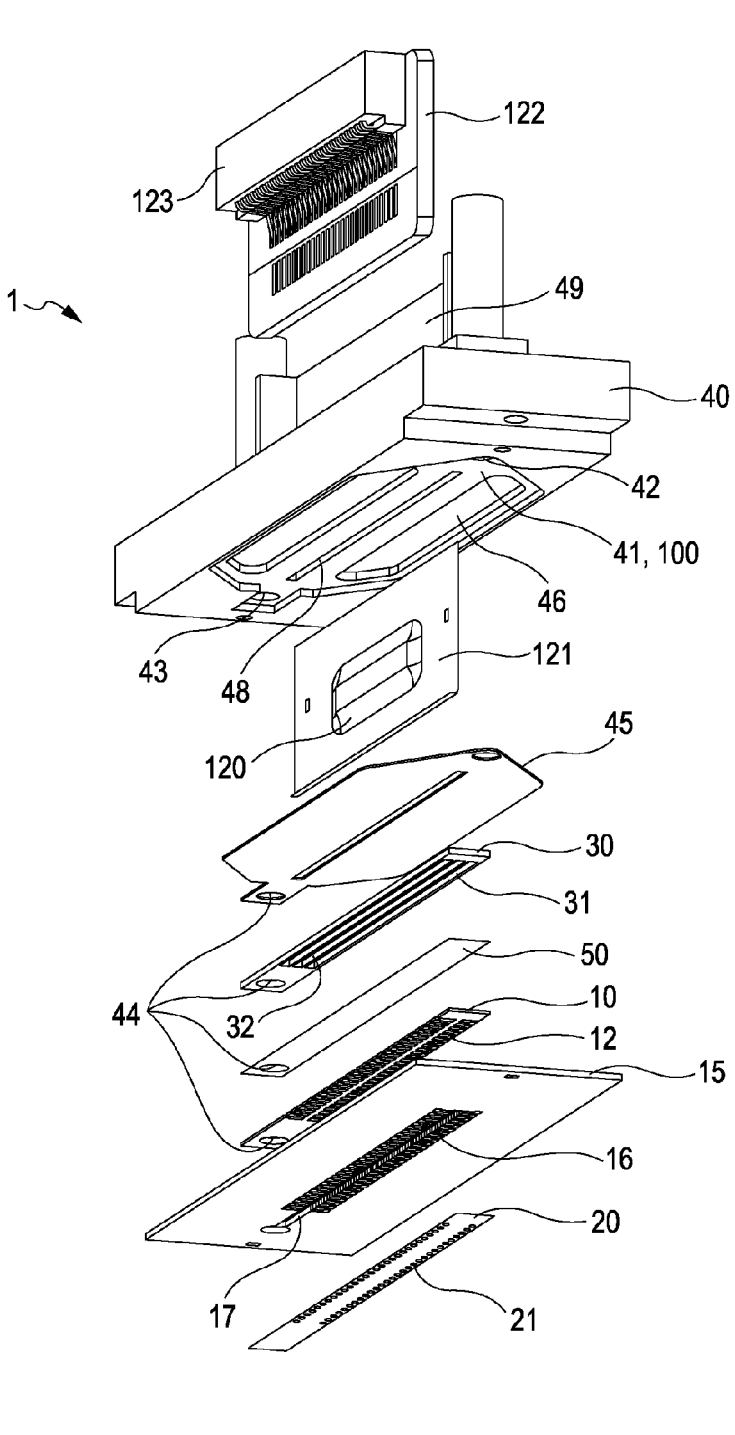
FIG. 1 is an exploded perspective view illustrating a recording head of a first embodiment.
Figure 2:
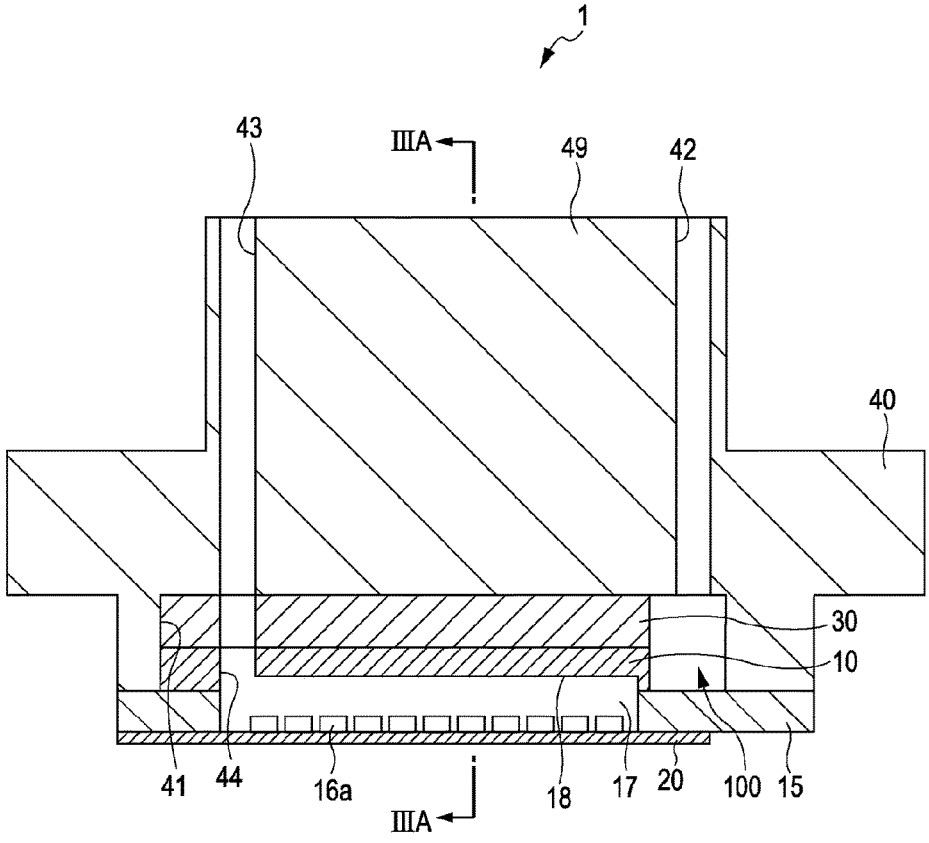
FIG. 2 is a cross-sectional view illustrating the recording head of the first embodiment.
Figure 3A:
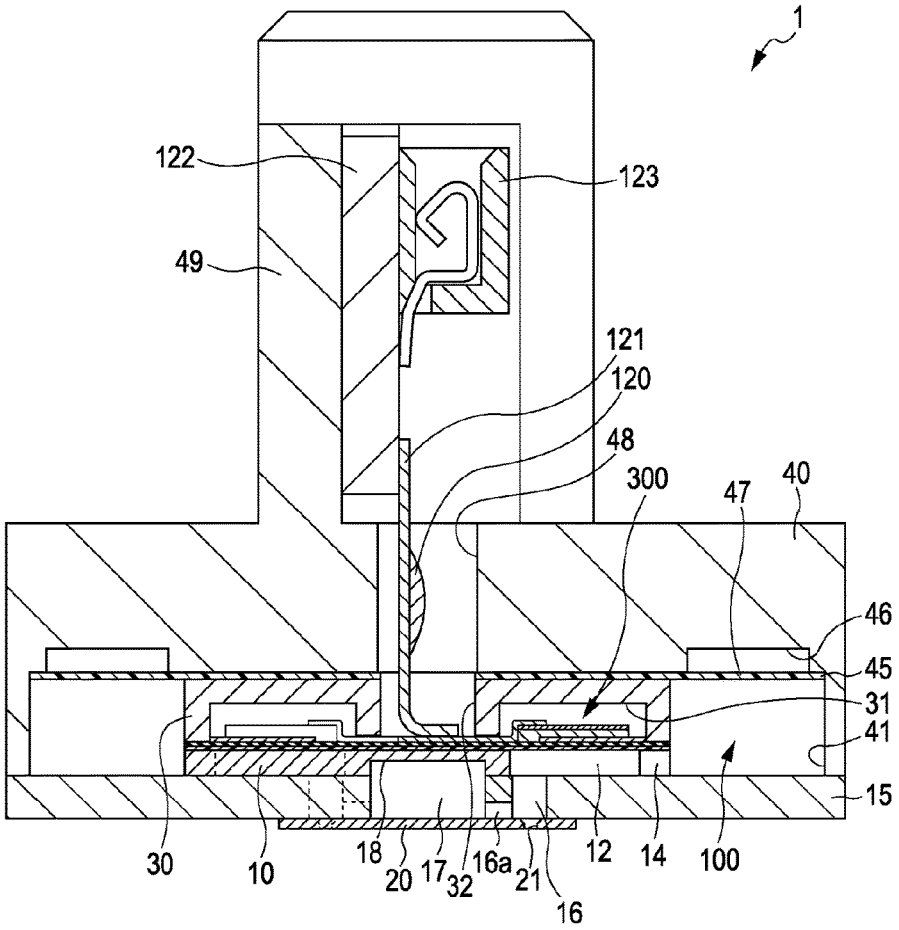
FIG. 3A is a cross-sectional view illustrating the recording head of the first embodiment taken along the line IIIA-IIIA in FIG. 2.
Figure 3B:
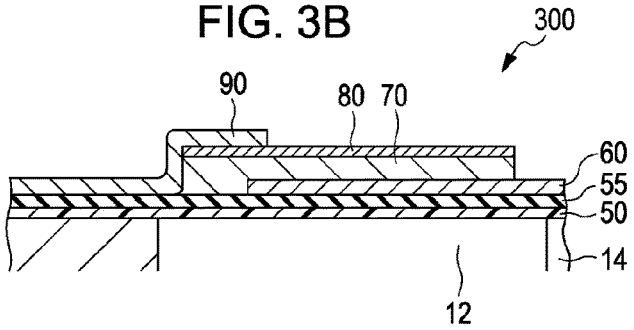
FIG. 3B is a cross-sectional view partially illustrating the recording head of the first embodiment in an enlarged manner.
Figure 4:
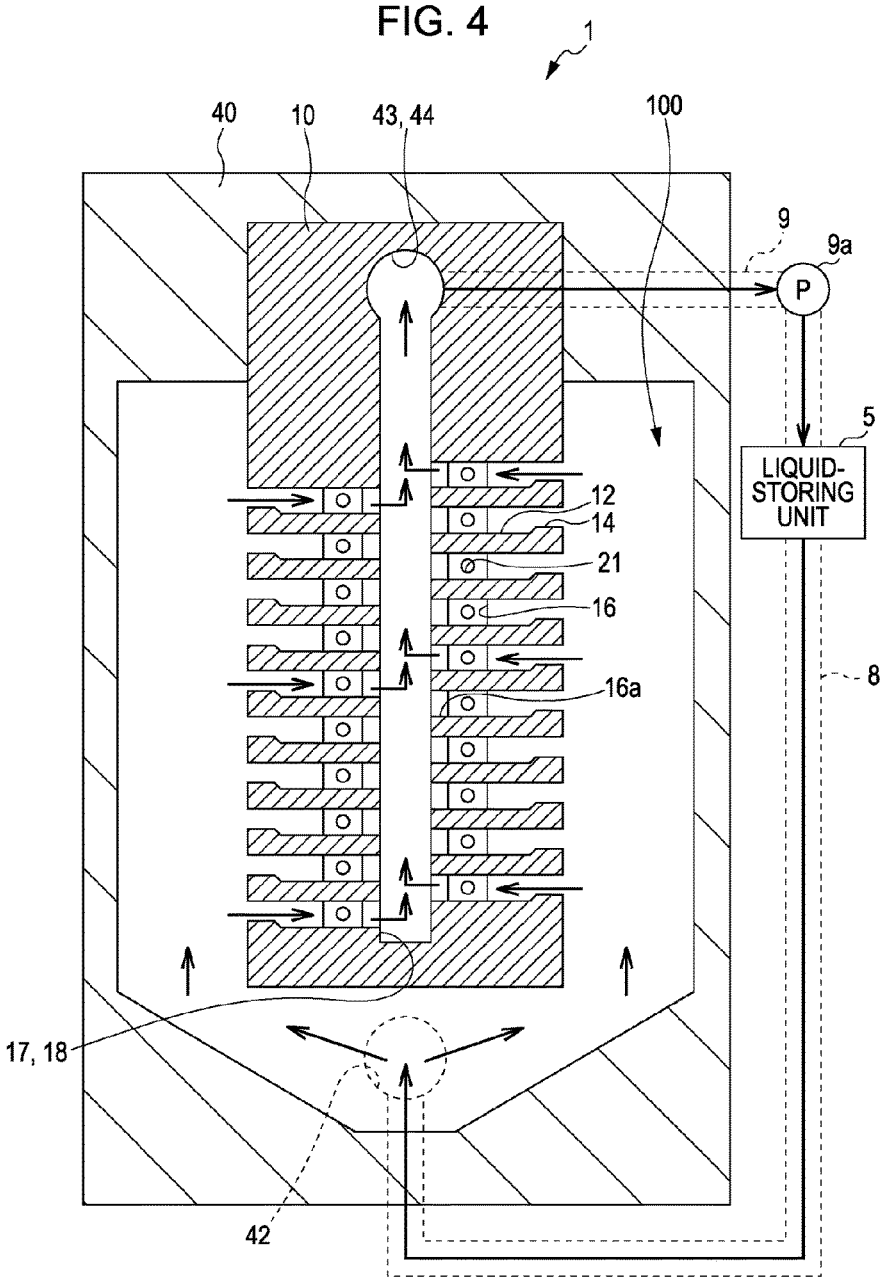
FIG. 4 is a cross-sectional view illustrating the channel configuration of the recording head of the first embodiment.

FIG. 1 is an exploded perspective view illustrating an ink jet recording head as an example of a liquid-ejecting head of the first embodiment of the invention. FIG. 2 is a cross-sectional view illustrating the ink jet recording head in the lateral direction of a pressure-generating chamber. FIG. 3A is a cross-sectional view illustrating the ink jet recording head taken along a line IIIA-IIIA in FIG. 2, and FIG. 3B is a cross-sectional view partially illustrating the ink jet recording head in FIG. 3A in an enlarged manner. FIG. 4 is a cross-sectional view illustrating a channel configuration.

In this embodiment, a silicon single-crystal substrate having a (110) orientation is used to form a channel-forming substrate 10, and an elastic film 50 that is made by using silicon dioxide is provided on one surface of the channel-forming substrate 10 as illustrated in the drawings. The channel-forming substrate 10 has two lines individually including a plurality of pressure-generating chambers 12 which are approximately linearly aligned in parallel. In the two lines of the pressure-generating chambers 12 which are approximately linearly aligned in parallel, the pressure-generating chambers 12 of one line are provided so as not to face the pressure-generating chambers 12 of the other line. Viewed from the pressure-generating chambers 12 of one line, the pressure-generating chambers 12 of the other line are displaced in half a distance to the adjacent pressure-generating chamber 12 aligned in parallel. By virtue of such a configuration, nozzle openings 21 which will be hereinafter described in detail are also displaced in half a distance to the adjacent nozzle opening in the individual two lines of the nozzle openings 21, thereby doubling resolution.

An ink-supplying channel 14 is provided at one end of each of the pressure-generating chambers 12 of the channel-forming substrate 10 in a longitudinal direction. Ink is supplied from a manifold 100 to the pressure-generating chambers 12 through the ink-supplying channels 14, the manifold 100 serving as a common liquid chamber for each of the pressure-generating chambers 12. Each of the ink-supplying chambers 14 has a width narrower than that of each of the pressure-generating chambers 12, thereby uniformly maintaining flow resistance of the ink which flows from the manifold 100 to the pressure-generating chambers 12. Meanwhile, in this embodiment, the pressure-generating chambers 12 and ink-supplying chambers 14 function as individual channels which are in communication with the manifold 100 as the common liquid chamber.

A communication plate 15 is provided to an opening surface (surface on the side opposite to the elastic film 50) of the channel-forming substrate 10 with an adhesive or thermally-fused film interposed therebetween. The communication plate 15 has communication channels 16 which are formed so as to penetrate the communication plate 15 in the thickness direction and which are in communication with individual pressure-generating chambers 12. The communication channels 16 are provided so as to be in communication with one ends of the corresponding pressure-generating chambers 12 in the longitudinal direction, such one ends being positioned opposite to the ends that are in communication with the ink-supplying channel 14. The communication channels 16 are independently provided for the corresponding pressure-generating chambers 12. The communication channels 16 are also approximately linearly aligned as in the case of the lines of the pressure-generating chambers 12. The pressure-generating chambers 12 are in communication with the nozzle openings 21 (hereinafter described in detail) through the communication channels 16.

In addition, the communication plate 15 has a circulation channel 17. The circulation channel 17 is provided between two lines of the pressure-generating chambers 12 approximately linearly aligned in parallel and is positioned in parallel with the entire two lines. The circulation channel 17 is in communication with the individual communication channels 16 of the communication plate 15 through circulation communication channels 16a which are provided for the corresponding communication channels 16 and which each have a hollow structure that opens toward a nozzle plate 20. In this embodiment, the lines of the pressure-generating chambers 12 aligned in parallel are in communication with the circulation channel 17 in common through the corresponding communication channels 16.

The circulation channel 17 is formed so as to penetrate the communication plate 15 in the thickness direction. In this embodiment, the channel-forming substrate 10 has an expansion portion 18 formed so as to partially face the circulation channel 17 and having a hollow structure. The expansion portion 18 has a hollow structure and has opening width and length approximately the same as those of the circulation channel 17, thereby increasing the cross-sectional area (cross-sectional area in the radial direction of the channel) of the circulation channel 17. In other words, the circulation channel 17 of the communication plate 15 and the expansion portion 18 of the channel-forming substrate 10 actually form a circulation channel of this embodiment.

In the circulation channel 17, the side not facing the expansion portion 18 (side facing the nozzle plate 20) is sealed with the nozzle plate 20.

The communication plate 15 has an area larger than that of the channel-forming substrate 10 (surface to which the channel-forming substrate 10 is bonded) and defines the manifold 100 together with a case 40 in a region outside the ink-supplying channels 14 defined by the channel-forming substrate 10, the case 40 being hereinafter described in detail. The communication plate 15 therefore has the approximately same area as that of the case 40 in the plan view in the direction of droplet ejection.

The nozzle plate 20 is attached to a surface, which is opposite to the channel-forming substrate 10, of the communication plate 15 with an adhesive or thermally-fused film interposed therebetween. The nozzle plate 20 has the nozzle openings 21 which are in communication with the corresponding pressure-generating chambers 12 through the individual communication channels 16. Examples of a material used for the nozzle plate 20 include metal such as stainless steel, a glass ceramic material, and a silicon single-crystal substrate.

In this embodiment, the nozzle plate 20 has a size smaller than that of the communication plate 15. The nozzle plate 20 has a size adequate to entirely cover the openings of the communication channels 16 which form at least two lines, the openings facing the nozzle plate 20. In addition, the nozzle plate 20 has a size which enables the circulation channel 17 to be sealed. In particular, the nozzle plate 20 does not entirely cover one surface of the communication plate 15 but has a size adequate to cover the circulation channel 17 and communication channels 16 of the communication plate 15. The nozzle plate 20 is formed so as to have a size smaller than that of the communication plate 15 in the plan view in the ejection direction in this manner, thereby being able to reduce production costs. Meanwhile, although not illustrated, a water-repellent film having water-repellent properties (liquid-repellent properties) is provided to the liquid-ejecting surface (side opposite to the communication plate 15) of the nozzle plate 20. The water-repellent film is expensive, and the production costs of the nozzle plate 20 are therefore increased depending on the area of the water-repellent film to be formed. In this embodiment, the nozzle plate 20 is formed so as to have a small size with the result that the area of the water-repellent film to be formed is reduced, thereby being able to decrease the production costs of the nozzle plate. It is obvious that the area of a metallic plate or ceramic plate as a material used for the nozzle plate 20 can be simply decreased, thereby being able to reduce the production costs.

The elastic film 50 is provided onto the surface, which is opposite to the communication plate 15, of the channel-forming substrate 10 as described above. An insulating film 55 is formed on the elastic film 50 by using, for example, zirconium oxide. Piezoelectric actuators 300 is each formed as a result of stacking a first electrode 60, piezoelectric layer 70, and a second electrode 80 on the insulating film 55 in sequence through deposition or by a lithographic technique. In this case, the piezoelectric actuator 300 refers to a section including the first electrode 60, piezoelectric layer 70, and second electrode 80. In general, any one of the electrodes of each of the piezoelectric actuators 300 functions as a common electrode, and the other electrode and the piezoelectric layer 70 are patterned for each of the pressure-generating chambers 12. In this embodiment, the first electrode 60 serves as the common electrode of the piezoelectric actuators 300, and the second electrode 80 serves as the individual electrodes of the piezoelectric actuators 300. The first electrode 60 and the second electrode 80 may be, however, configured so as to have opposite functions each other depending on the configuration of a driving circuit and wiring. Although the elastic film 50, insulating film 55, and first electrode 60 form a vibrating plate in this embodiment, embodiments of the invention are not obviously limited to such a configuration. The elastic film 50 and insulating film 55 may not be, for example, formed, and the first electrode 60 may alone serve as the vibrating plate. Furthermore, the piezoelectric actuators 300 themselves may also substantially function as the vibrating plate.

The second electrodes 80 as the individual electrodes of the piezoelectric actuators 300 are individually connected to lead electrodes 90 which are formed by using, for example, gold (Au). A circuit board 121 as a flexible wiring board which is formed in the manner of chip on film (COF) contacts the lead electrodes 90, and a driving circuit 120 such as a driving integrated circuit (IC) is provided to the circuit board 121. Signals are transmitted from the driving circuit 120 to the individual piezoelectric actuators 300 through the circuit board 121 and lead electrodes 90.

A protection substrate 30 is bonded by using an adhesive or thermally-fused film so as to overlie the piezoelectric actuators 300 above the channel-forming substrate 10 in a region in which the channel-forming substrate 10 faces the piezoelectric actuators 300, and the protection substrate 30 has holding portions 31 which can serve to secure spaces sufficient to ensure displacement of the piezoelectric actuators 300. The piezoelectric actuators 300 are formed in the holding portions 31 and are therefore protected so as to be substantially free from influence of external environment. In this embodiment, the two lines of the piezoelectric actuators 300 aligned in parallel in the width direction are formed so as to correspond to the two lines of the pressure-generating chambers 12 aligned in parallel in the width direction, and the holding portions 31 are provided so as to cover the entire lines of the piezoelectric actuators 300 aligned in the width direction. In addition, the holding portions 31 are independently provided for the individual lines of the piezoelectric actuators 300.

The protection substrate 30 has a through-hole 32 which is formed between the two holding portions 31 so as to penetrate the protection substrate 30 in the thickness direction. One end of each of the lead electrodes 90 extending from the piezoelectric actuators 300 on the channel-forming substrate 10 is extended so as to be exposed inside the through-hole 32. The lead electrodes 90 are electrically connected to the circuit board 121 inside the through-hole 32.

In this embodiment, the protection substrate 30 is formed so as to have a size (area of the bonded surface) substantially the same as that of the channel-forming substrate 10. Examples of a material used for the protection substrate 30 include a glass ceramic material, metal, and resin. The protection substrate 30 is preferably formed by using a material having a coefficient of thermal expansion substantially the same as that in the channel-forming substrate 10, and the silicon single-crystal substrate used as a material of the channel-forming substrate 10 is also used to form the protection substrate 30 in this embodiment.

The side, which is opposite to the channel-forming substrate 10, of the protection substrate 30 is attached to the case 40, and the case 40 forms the manifold 100.

The case 40 has a hollow 41 which faces the protection substrate 30, and the channel-forming substrate 10 and the protection substrate 30 are accommodated in the hollow 41. The hollow 41 has an area larger than the area in which the protection substrate 30 is attached to the channel-forming substrate 10 and has a depth approximately the same as the total thickness of the channel-forming substrate 10 and protection substrate 30 which have been attached to each other. The opening of the hollow 41 is sealed by the communication plate 15, thereby holding the protection substrate 30 and the channel-forming substrate 10 inside the hollow 41. In particular, the surface, which is opposite to the channel-forming substrate 10, of the protection substrate 30 is attached to the inside of the hollow 41, and the surface, to which the channel-forming substrate 10 has been attached, of the communication plate 15 is attached to the surface, which has the opening of the hollow 41, of the case 40 (surface around the hollow 41). By virtue of such a configuration, the channel-forming substrate 10 and the protection substrate 30 are held inside the hollow 41, and the manifold 100 is formed in a region (edge) outside the ink-supplying channels 14 defined by the channel-forming substrate 10 and protection substrate 30, the manifold 100 being provided as a space defined by the case 40 and communication plate 15. In this embodiment, the protection substrate 30 and channel-forming substrate 10 are held at the center of the hollow 41 of the case 40, and the manifold 100 is formed at the two sides of the center of the hollow 41 so as to be in communication with the individual pressure-generating chambers 12 in common. With reference to FIG. 4, the manifold 100 has a branched channel in which ink that is fed from an introduction channel 42 formed in the case 40 is distributed to the individual lines of the pressure-generating chambers 12. The case 40 has the introduction channel 42 which is in communication with the manifold 100 to supply ink to the manifold 100 and has a discharging channel 43 which is in communication with the circulation channel 17 to discharge ink transported from the circulation channel 17.

The introduction channel 42 is formed so as to be in communication with the middle of the upper portion (side opposite to the communication plate 15) of the manifold 100, such an upper portion being positioned at one side of each of the channel-forming substrate 10 and protection substrate 30 in the lateral direction of the pressure-generating chambers 12.

The discharging channel 43 is formed at the side opposite to the introduction channel 42 in the direction in which the pressure-generating chambers 12 are aligned in parallel. The channel-forming substrate 10, the protection substrate 30, and a sealing film 45 hereinafter described each have a communication discharging channel 44 which serves to form a communication between the discharging channel 43 of the case 40 and the circulation channel 17.

As illustrated in FIG. 4, the introduction channel 42 and the discharging channel 43 are respectively connected to a supplying tube 8 and a retrieving tube 9 which are each provided in the form of a tube, and the supplying tube 8 and retrieving tube 9 are connected to a liquid-storing unit 5 in which ink is externally stored. In particular, one end of the supplying tube 8 is connected to the liquid-storing unit 5, and the other end thereof is connected to the introduction channel 42, thereby supplying ink stored in the liquid-storing unit 5 to the case 40.

One end of the retrieving tube 9 is connected to the liquid-storing unit 5, and the other end thereof is connected to the discharging channel 43. A pump 9a is provided between the two ends of the retrieving tube 9. The ink transported from the liquid-storing unit 5 is retrieved from the ink jet recording head 1 to the liquid-storing unit 5 as a result of application of pressure by the pump 9a. The sealing film 45 is provided to the bottom of the hollow 41 of the case 40, the bottom being positioned on the side to which the protection plate 30 is attached. The sealing film 45 is formed by using a flexible material having low rigidity, such as polyphenylene sulfide (PPS). The manifold 100 is partially sealed by the sealing film 45.

The case 40 has regions facing the manifold 100 and having hollow structures, and such regions serve as space 46. In the manifold 100, the side near the case 40 (side opposite to the communication plate 15) partially functions as a flexible portion 47 which is sealed by the sealing film 45 alone and which can be flexibly deformed.

The case 40 has a connection hole 48 which is formed so as to penetrate the case 40 in the thickness direction and so as to be in communication with the through-hole 32 of the protection substrate 30. The circuit board 121 inserted into the connection hole 48 is also inserted into the through-hole 32 of the protection substrate 30, thereby contacting the lead electrodes 90. A wall 49 is provided on the surface, which is opposite to the opening of the hollow 41, of the case 40 at the periphery of the opening of the connection hole 48. The wall 49 supports the circuit board 121 and a connection substrate 122 attached to the circuit board 121. In this embodiment, the connection substrate 122 is configured as a rigid substrate to which a connector 123 is provided, and the connector 123 is connected to external wiring. The circuit board 121 connected to the lead electrodes 90 is electrically connected to the connection substrate 122. External wiring (not illustrated) is connected to the connector 123 of the connection substrate 122, thereby transmitting printing signals from the external wiring to the circuit board 121.

The case 40 having such a configuration is used to form the manifold 100, thereby being able to reduce the size of each of the channel-forming substrate 10 and protection substrate 30. In the case where a manifold is formed in a channel-forming substrate or protection substrate, for example, the channel-forming substrate or protection substrate defines the peripheral wall of the manifold, and the sizes of the channel-forming substrate and protection substrate are therefore increased in the longitudinal direction of a pressure-generating chamber. To the contrary, in this embodiment, the end faces of the channel-forming substrate 10 and protection substrate 30 define one side of the manifold 100 (in the longitudinal direction of the pressure-generating chamber 12), and the caser 40 defines the other side of the manifold 100. The size of each of the channel-forming substrate 10 and protection substrate 30 can be therefore reduced. Owing to such an advantage, in the case where a plurality of the channel-forming substrates 10 or protection substrates 30 are integrally formed using a large substrate such as a silicon wafer, the size reduction of the channel-forming substrate 10 and protection substrate 30 enables the number of products made from the large substrate to be increased, thereby being able to reduce production costs. Meanwhile, a plurality of the channel-forming substrates 10 or protection substrates 30 are integrally formed using a large substrate such as a silicon wafer with the result that a plurality of the channel-forming substrates 10 or protection substrates 30 can be simultaneously formed, thereby being able to reduce production costs.

In this embodiment, the communication plate 15 defines the nozzle plate 20-side surface of the manifold 100, and the nozzle plate 20 does not therefore need to have a size adequate to overlap the manifold 100 in the stacking direction (thickness direction). The nozzle plate 20 can be accordingly formed so as to have a reduced size, thereby being able to reduce the production costs of the nozzle plate 20.

In the ink jet recording head 1 having such a structure, ink is supplied from the liquid-storing unit 5 to the introduction channel 42 through the supplying channel 8. The ink supplied to the introduction channel 42 is then supplied to the individual pressure-generating chambers 12 through the manifold 100. On the basis of signals transmitted from the driving circuit 120, the piezoelectric actuator 300 corresponding to any of the pressure-generating chambers 12 is then driven to cause bending and deformation with the result that the volume of the pressure-generating chamber 12 is changed, thereby ejecting an ink droplet from corresponding one of the nozzle openings 21.

The ink supplied to the pressure-generating chambers 12 is discharged to the retrieving tube 9 through the communication channels 16, circulation channel 17, and discharging channel 43 as a result of application of pressure by the pump 9a. The ink is then retrieved to the liquid-storing unit 5 through the retrieving tube 9. In this case, the communication channels 16 are provided to form communications between the pressure-generating chambers 12 and the nozzle openings 21, and the communication channels 16 are connected to the circulation channel 17. By virtue of such a configuration, ink in the vicinity of the nozzle openings 21 immediately before being ejected can be retrieved to the liquid-storing unit 5. In other words, the ink can be successfully circulated. The viscosity of ink immediately before being ejected is accordingly prevented from being increased resulting from drying of the ink, and deposition of components contained in the ink can be suppressed. In addition, even after the passage of a certain time period, ejection properties of ink can be substantially uniformly maintained. By virtue of such advantages, variation in ejection properties can be suppressed, and quality of liquid ejection can be therefore enhanced.

Second Embodiment

Figure 5:
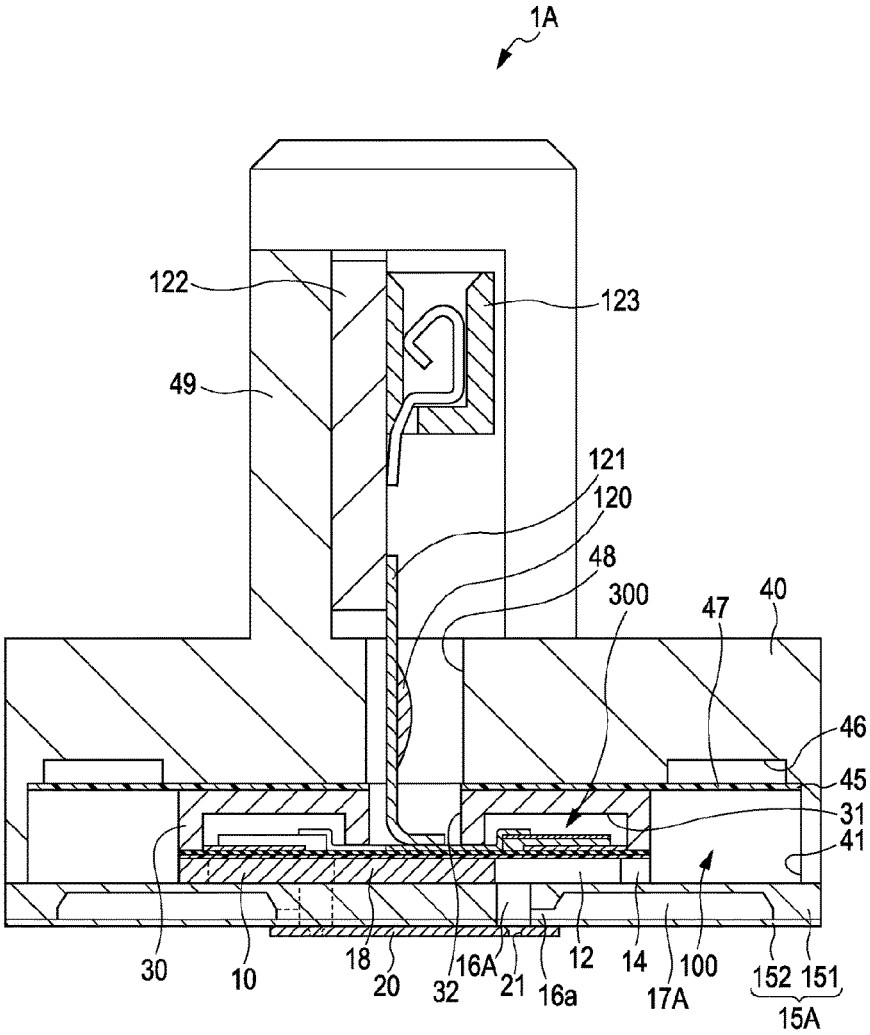
FIG. 5 is a cross-sectional view illustrating a recording head of a second embodiment.

FIG. 5 is a cross-sectional view illustrating an ink jet recording head as an example of a liquid-ejecting head of a second embodiment of the invention. In this embodiment, the components the same as those in the first embodiment are denoted by the same symbols, and similar description is omitted.

With reference to FIG. 5, an ink jet recording head 1A of this embodiment includes the channel-forming substrate 10 on which the piezoelectric actuators 300 are formed, the nozzle plate 20 having the nozzle openings 21, a communication plate 15A provided between the channel-forming substrate 10 and nozzle plate 20, the protection substrate 30, and the case 40.

The communication plate 15A is provided between the channel-forming substrate 10 and the nozzle plate 20 and is formed as a result of stacking a second communication plate 152 and a first communication plate 151 in sequence from the nozzle plate 20 to the channel-forming substrate 10.

The communication plate 15A has communication channels 16A, circulation channels 17A, and the circulation communication channels 16a which individually form communications between the communication channels 16A and the circulation channels 17A.

The communication channels 16A individually form communications between the pressure-generating chambers 12 and nozzle openings 21 at one ends, which are opposite to the ink-supplying channels 14, of the pressure-generating chambers 12.

The circulation channels 17A each have a hollow structure which is formed in the first communication plate 151 and which opens toward the second communication plate 152. Such an opening, which faces the nozzle plate 20, of each of the circulation channels 17A is sealed by the second communication plate 152. The circulation channels 17A are positioned so as to overlap the lines of the pressure-generating chambers 12 and the manifolds 100 in a direction in which the communication plate 15A and channel-forming substrate 10 are stacked, the pressure-generating chambers 12 being aligned in parallel in the width direction, and the manifolds 100 individually functioning in common for the corresponding lines of the pressure-generating chambers 12. In this case, each of the circulation channels 17A is provided for corresponding one of the lines of the pressure-generating chambers 12 provided in parallel in the width direction.

The circulation communication channels 16a individually form communications between the circulation channels 17A and the communication channels 16A. The circulation communication channels 16a each have a hollow structure which is formed in the first communication plate 151 and which opens toward the second communication plate 152 and are provided for the individual communication channels 16A.

In the ink jet recording head 1A having the circulation channels 17A, each of the circulation channels 17A is provided for corresponding one of the lines of the pressure-generating chambers 12, and different types of inks can be supplied to the two manifolds 100. In particular, different types of inks can be ejected from individual two lines of the nozzle openings 21.

Third Embodiment

Figure 6:
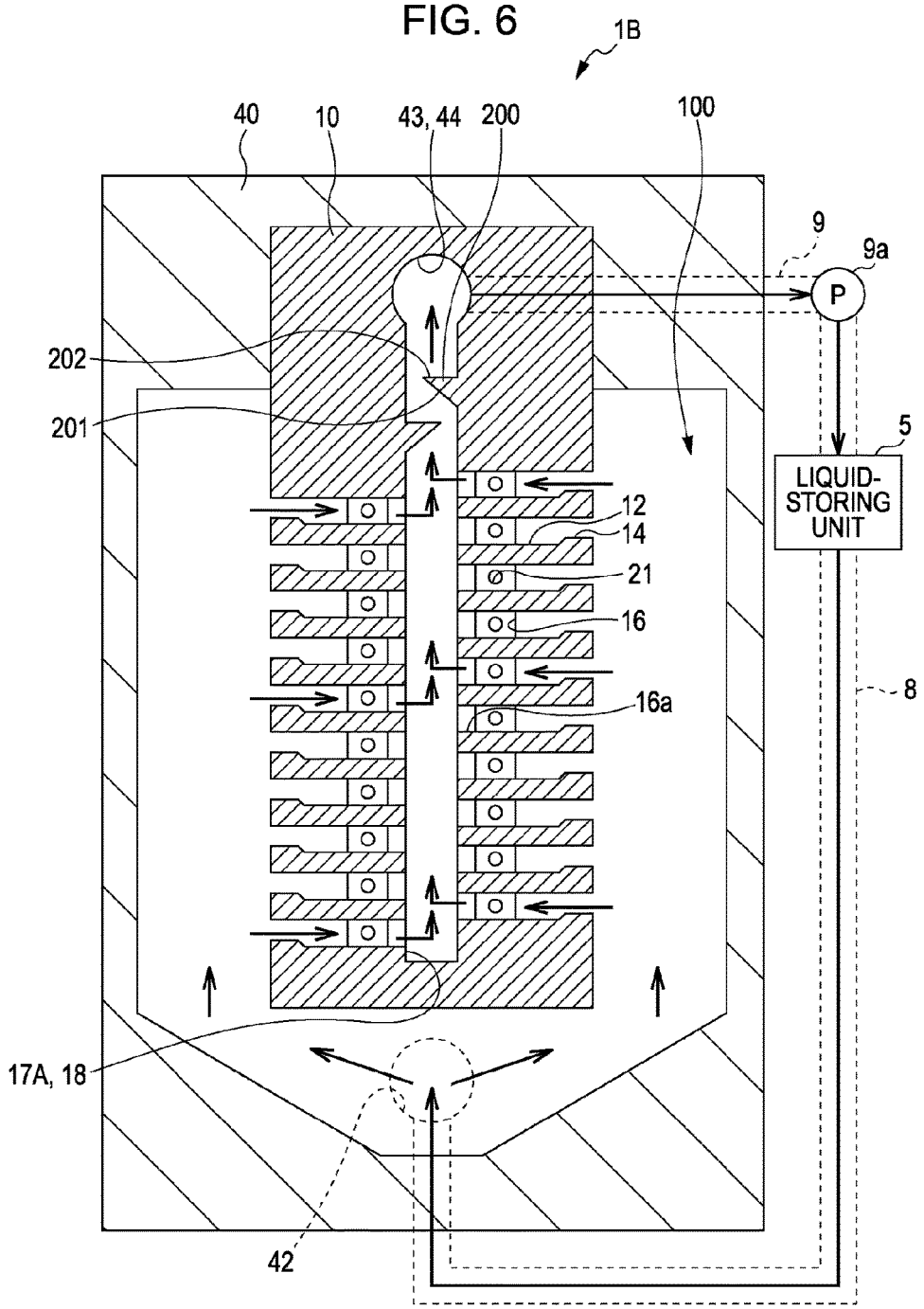
FIG. 6 is a cross-sectional view illustrating the channel configuration of a recording head of a third embodiment.
Figure 7:
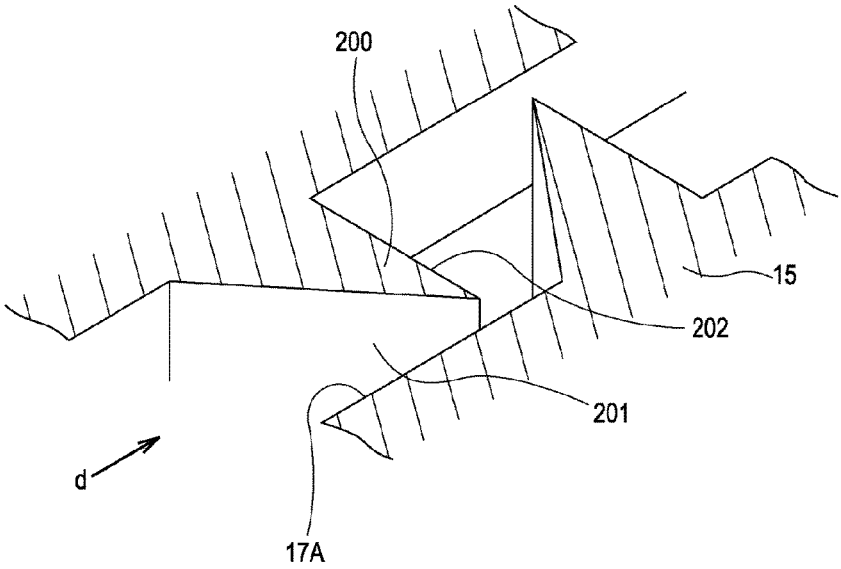
FIG. 7 is a perspective view partially illustrating the channel of the recording head of the third embodiment in an enlarged manner.
Figure 8:
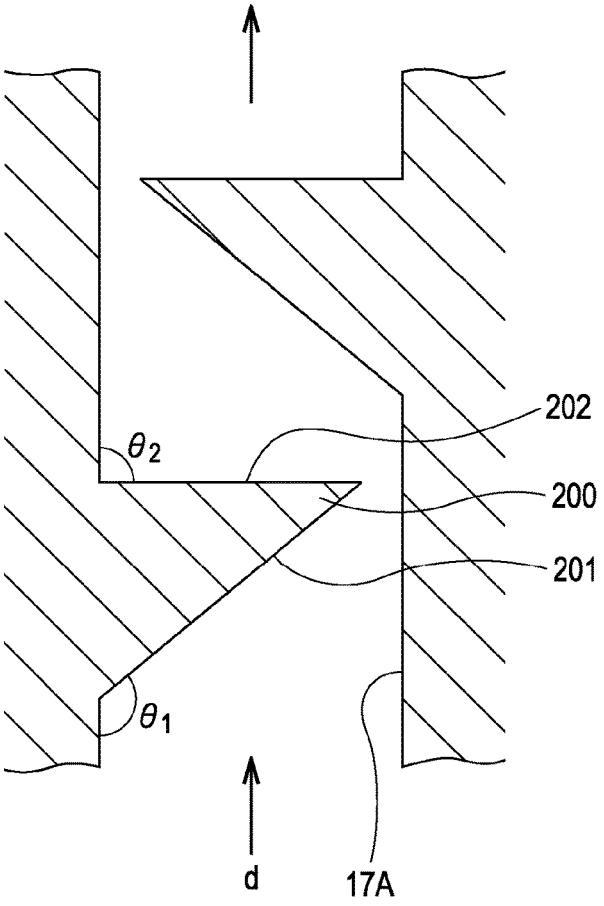
FIG. 8 is a plan view partially illustrating the channel of the third embodiment in an enlarged manner.

FIG. 6 is a cross-sectional view illustrating a channel configuration of a third embodiment. FIG. 7 is a perspective view partially illustrating a circulation channel in an enlarged manner. FIG. 8 is a plan view partially illustrating the circulation channel in an enlarged manner. In this embodiment, the components the same as those in the first embodiment are denoted by the same symbols, and similar description is omitted.

As illustrated in the drawings, an ink jet recording head 1B of this embodiment has a configuration the same as that in the first embodiment except that narrow portions 200 are formed at part of the circulation channel 17A.

In particular, a plurality of the narrow portions 200 are provided on the downstream side (side of the discharging channel 43) relative to a region in which the circulation channel 17A is in communication with the individual circulation communication channels 16a, and two narrow portions 200 are provided in this embodiment.

The narrow portions 200 are provided so as to protrude from the inner walls of the circulation channel 17A in the width direction of the channel. In other words, the narrow portions 200 protrude so as to intersect a direction (hereinafter referred to as a forward direction d) in which the ink flows in the circulation channel 17A to circulate from the pressure-generating chambers 12 to the manifold 100 (discharging channel 43) and are provided so as to reduce the cross-sectional area of the circulation channel 17A in the radial direction of the channel. In this case, the cross-sectional area of the circulation channel 17A hereinafter refers to a cross-sectional area in the radial direction of the channel and a cross-sectional area which intersects the forward direction d.

Each of the narrow portions has a first wall 201 and second wall 202 which are each tilted with respect to the forward direction d. The first wall 201 serves to gradually decrease the cross-sectional area of the circulation channel 17A toward the downstream side (side of the discharging channel 43). The second wall 202 serves to gradually increase the cross-sectional area, which has been gradually decreased by the first wall 201, of the circulation channel 17A with the result that the circulation channel 17A comes to have the cross sectional-area with the same size as that in the upstream side relative to the first wall 201.

In particular, each of the narrow portions 200 has the first wall 201 which faces the upstream side in the forward direction d and has the second wall 202 which faces the downstream side in the forward direction d.

In each of the narrow portions 200, the first wall 201 and second wall 202 each have a flat surface profile, and the tip of the first wall 201 contacts the tip of the second wall 202. In particular, viewed from the side of the channel-forming substrate 10 in the top view, each of the narrow portions 200 has a triangular shape.

In each of the narrow portions 200, the first wall 201 has a tilt angle $\theta_1$ with respect to the inner wall of the circulation channel 17A at the upstream side relative to the first wall 201 in the forward direction d, and the tilt angle $\theta_1$ is larger than the tilt angle $\theta_2$ of the second wall 202 with respect to the inner wall of the circulation channel 17A at the downstream side relative to the second wall 202 in the forward direction d ($\theta_1>\theta_2$).

In particular, in each of the narrow portions 200, a proportion (decreasing rate: tilt angle) in which the first wall 201 functions to decrease the cross-sectional area of the circulation channel 17A in an unit distance in the forward direction d is smaller than a proportion (decreasing rate: tilt angle) in which the second wall 202 functions to decrease the cross-sectional area of the circulation channel 17A in an unit distance in a direction opposite to the forward direction d.

The narrow portions 200 each having the first wall 201 and second wall 202 is provided in this manner, thereby being able to decrease the flow resistance of the ink flowing in the circulation channel 17A in the forward direction d relative to the flow resistance in the opposite direction. In particular, in the case where each of the narrow portions 200 serves to decrease the width (width in the longitudinal direction of the pressure-generating chamber 12) of the circulation channel 17A to a dimension of 5.0 μm, a ratio of the flow resistance in the forward direction d to the flow resistance in the opposite direction is 0.84%. Furthermore, in the case where each of the narrow portions 200 serves to decrease the width of the circulation channel 17A to a dimension of 10 μm, such a ratio in the flow resistance is 0.65%.

In the ink jet recording head 1B having such a configuration, in the case where the ink in the pressure-generating chamber 12 is respectively exposed to generation of positive pressure and negative pressure as a result of increasing and decreasing the volume of the pressure-generating chamber 12 by the driving of the piezoelectric devices 300, the ink reciprocates in the circulation channel 17A respectively in the forward direction d and opposite direction. In this case, because formation of the narrow portions 200 contribute to generating difference between the forward direction d and opposite direction in the flow resistance of ink which flows in the circulation channel 17A, the ink easily flows in the forward direction d and has difficulty in flowing in the opposite direction. The ink in the pressure-generating chambers 12 can be therefore transported through the circulation channel 17A in the forward direction d as a result of the driving of the piezoelectric actuators 300.

Figure 9:
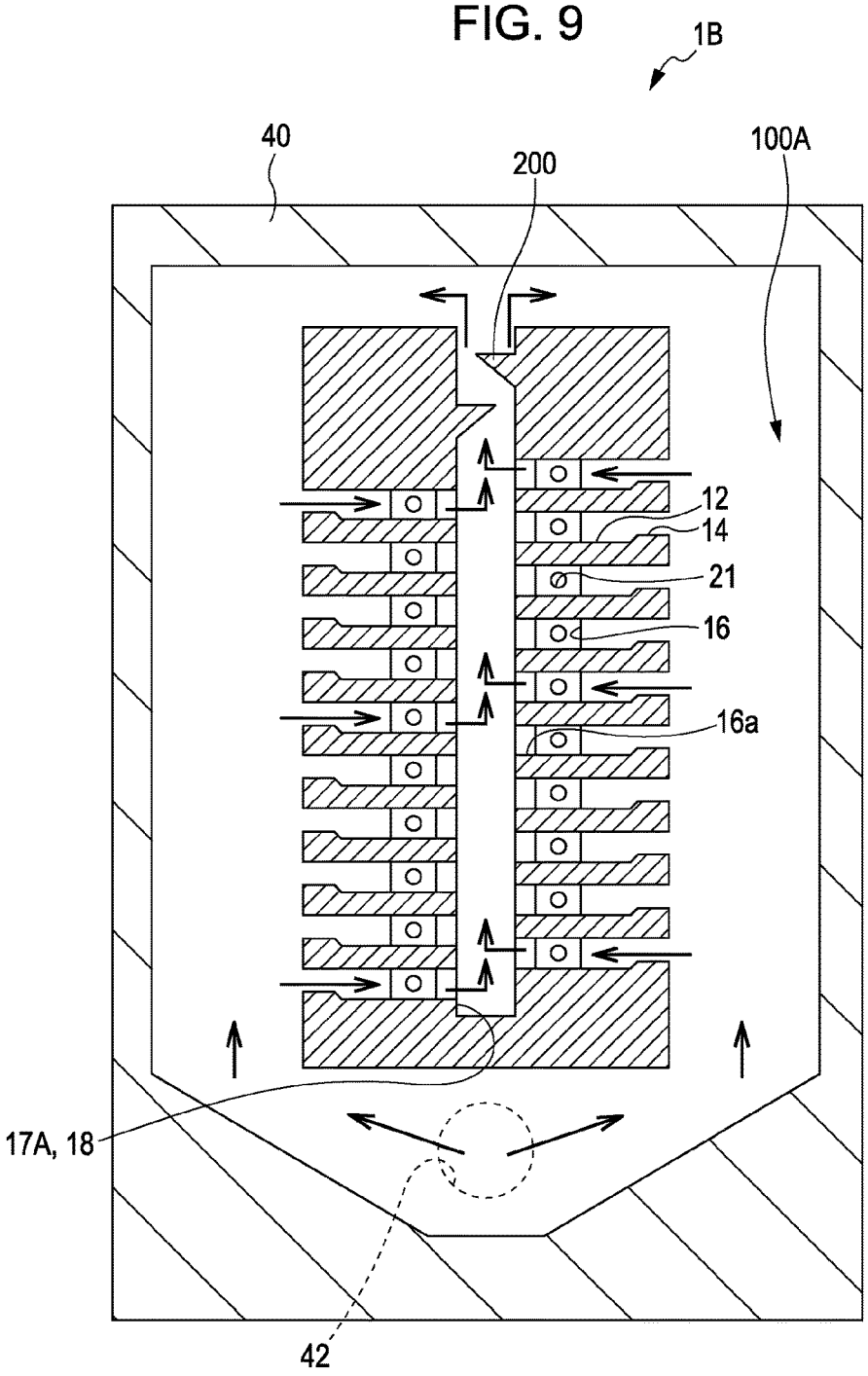
FIG. 9 is a cross-sectional view illustrating a modification of the channel configuration of the third embodiment.

In addition, ink can be circulated only by the driving of the piezoelectric actuators 300 without the pump 9a provided in the first and second embodiments. The circulation channel 17A may be therefore configured so as to be directly in communication with the manifold 100. FIG. 9 illustrates an example of such a configuration. In an ink jet recording head illustrated in FIG. 9, the discharging channel 43 and communication discharging channel 44 are not provided, and a manifold 100A is formed so as to surround the peripheries of the channel-forming substrate 10 and protection substrate 30. An end of the circulation channel 17A (on the side of the second wall 202) is in communication with the manifold 100A. In such a configuration, use of the pump 9a is excluded, and the ink can be circulated only by the driving of the piezoelectric actuators 300.

Figure 10:
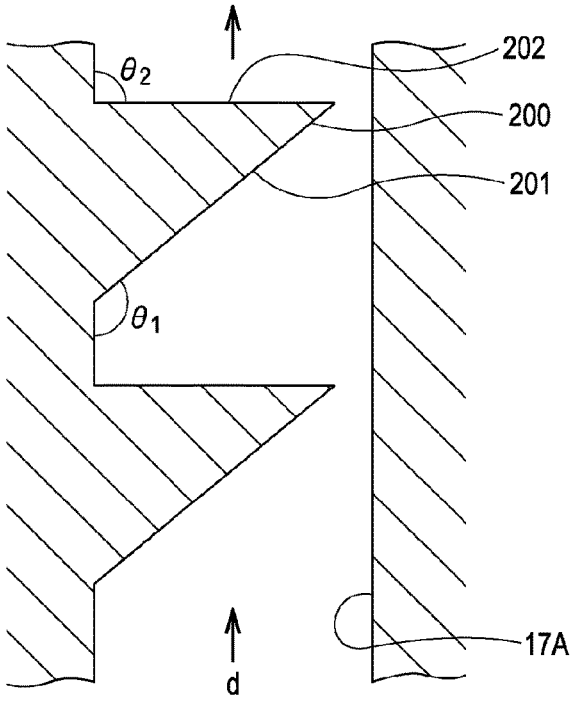
FIG. 10 is a plan view partially illustrating a modification of the channel of the third embodiment in an enlarged manner.
Figure 11:
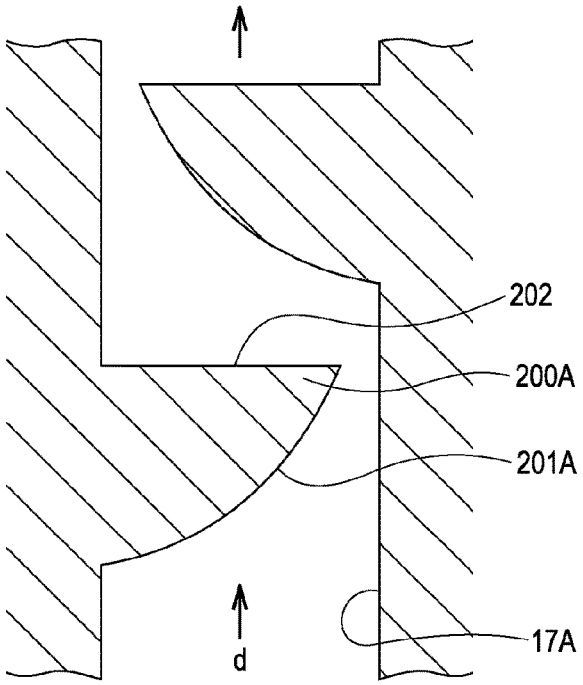
FIG. 11 is a plan view partially illustrating another modification of the channel of the third embodiment in an enlarged manner.

In the above embodiments, although the two narrow portions 200 are individually provided on the facing walls of the circulation channel 17A, embodiments of the invention are not particularly limited to such a configuration. As illustrated in FIG. 10, for example, the two narrow portions 200 may be provided so as to protrude from one wall of the circulation channel 17A in the same direction. In addition, because the first wall 201 and second wall 202 of each of the narrow portions 200 may function to gradually decrease or increase the cross-sectional area of the circulation channel 17A in the forward direction d, the first wall 201 and second wall 202 may have any surface profile other than a planar surface. In particular, for example, a narrow portions 200A may be configured so as to each have a first wall 201A having a curved surface (circular arc-shaped cross-sectional surface), not a planar surface, as illustrated in FIG. 11.

The number and configurations of the narrow portions 200 and 200A are not obviously limited to the above. The narrow portions 200 and 200A may be, for example, provided in the number of one or at least three, and the narrow portions 200 and 200A may be provided to the circulation communication channels 16a.

Other Embodiments

Although the individual embodiments of the invention have been described, the basic configuration of embodiments of the invention is not limited to the above embodiments. Although the silicon single-crystal substrate is, for example, used for the channel-forming substrate 10 in each of the embodiments, any other materials may be used. Examples of such other materials include a silicon-on-insulator (SOI) substrate, glass material, and metal material.

Although the thin-film piezoelectric actuator 300 is used as a pressure generator in the above embodiments, embodiments of the invention are not limited to such a structure, the pressure generator enabling pressure change to be generated in the pressure-generating chambers 12. Example of the piezoelectric actuator to be used include a thick-film piezoelectric actuator which is formed, for example, as a result of attaching a green sheet and include a vertical vibration-type piezoelectric actuator which is formed as a result of alternately stacking a piezoelectric material and an electrode-forming material and which expands and contracts in the axial direction. Examples of a pressure generator to be used include one of a type in which a heater is disposed in a pressure-generating chamber and in which bubbles are generated as a result of heat emission by the heater with the result that droplets are ejected from nozzle openings and include an electrostatic actuator in which static electricity is generated between a vibrating plate and an electrode and in which the vibrating plate is then deformed by the electrostatic force with the result that droplets are ejected from nozzle openings.

Figure 12:
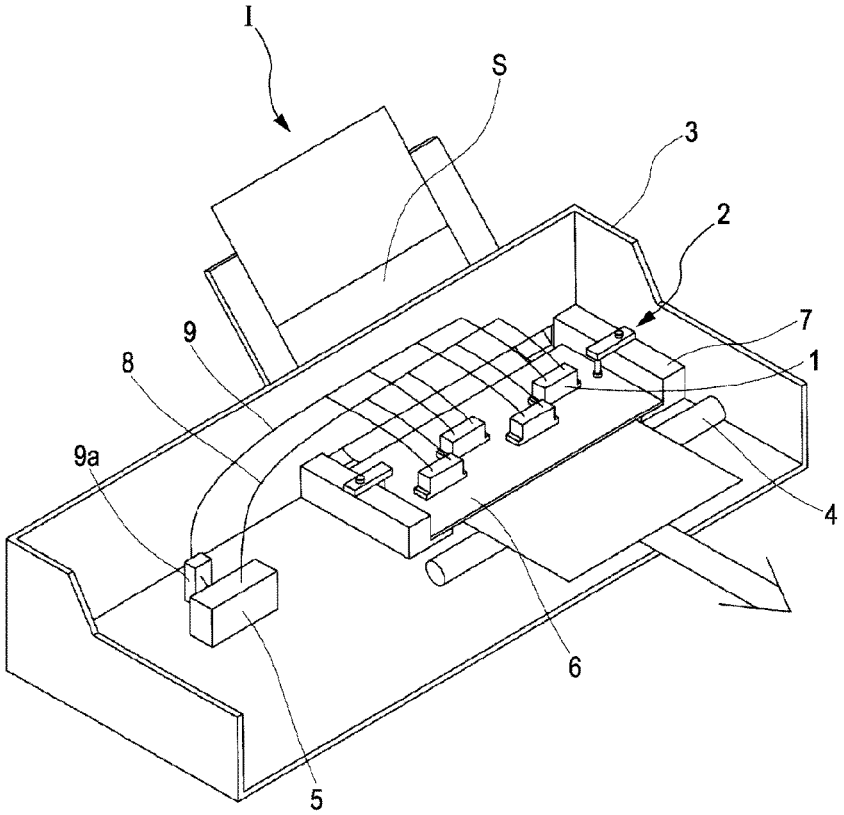
FIG. 12 schematically illustrates the configuration of a recording apparatus of an embodiment.

The ink jet recording head 1 serves as a component of an ink jet recording head unit and is provided to an ink jet recording apparatus. FIG. 12 schematically illustrates an example of the ink jet recording apparatus.

The ink jet recording apparatus of this embodiment is configured as a line-type ink jet recording apparatus, in which the ink jet recording head 1 is fixed to the apparatus body and in which printing is performed as a result of transporting an ejection medium such as recording paper in a direction orthogonally intersecting a direction in which the nozzle openings 21 are aligned in parallel.

In particular, with reference to FIG. 12, an ink jet recording apparatus I has an ink jet recording head unit 2 including the ink jet recording head 1, an apparatus body 3, a roller 4, and the liquid-storing unit 5, the roller 4 transporting a recording sheet S as a recording medium.

The ink jet recording head unit 2 (hereinafter referred to as the head unit 2, where appropriate) has a plurality of the ink jet recording heads 1 and has a flat base plate 6 which holds the ink jet recording heads 1. The base plate 6 is attached to a frame 7, thereby fixing the head unit 2 to the apparatus body 3.

The roller 4 is provided to the apparatus body 3. The roller 4 transports the recording sheet S as the ejection medium such as paper which has been fed to the apparatus body 3 and helps the recording sheet S to pass below the ink-ejecting surfaces of the ink jet recording heads 1.

As described above, each of the ink jet recording heads 1 is connected to the liquid-storing unit 5 through the supplying tube 8 and retrieving tube 9 each provided in the form of a flexible tube, the liquid-storing unit 5 being fixed to the apparatus body 3 to store the ink. Ink is supplied from the liquid-storing unit 5 to each of the ink jet recording heads 1 through the supplying tube 8, and the ink not ejected from the ink jet recording heads 1 is retrieved to the liquid-storing unit 5 through the retrieving tube 9. The pump 9a is provided between the two ends of the retrieving tube 9. Owing to pressure applied by the pump 9a, the ink supplied from the liquid-storing unit 5 flows through the liquid channels (manifold 100 and circulation channel 17) in each of the ink jet recording heads 1 and is then circulated.

In the ink jet recording apparatus I having such a configuration, the roller 4 transports the recording sheet S in the transport direction, and ink is ejected from the ink jet recording heads 1 of the head unit 2, thereby printing images on the recording sheet S.

In this embodiment, although the ink jet recording apparatus I includes a single head unit 2 having a plurality of the ink jet recording heads 1, the ink jet recording apparatus I may include two or more head units 2. Furthermore, the ink jet recording head 1 may be directly mounted on the ink jet recording apparatus I.

In this embodiment, although the line-type ink jet recording apparatus I in which the ink jet recording head 1 is fixed and in which recording is performed only as a result of transporting the recording sheet S is used, embodiments of the invention are not particularly limited to such a recording apparatus. Embodiments of the invention may be, for example, also applied to a serial-type ink jet recording apparatus in which the ink jet recording head 1 is mounted on a carriage which moves in a direction (main scanning direction) intersecting the transport direction of the recording sheet S and in which printing is performed while the ink jet recording head 1 moves in the main scanning direction.

In this embodiment, although the ink jet recording apparatus I has a configuration in which the liquid-storing unit 5 is fixed to the apparatus body 3, embodiments of the invention are particularly not limited to such a configuration. Embodiments of the invention may be, for example, also applied to an ink jet recording apparatus in which a liquid-storing unit such as an ink cartridge is fixed to each of the ink jet recording heads 1, the ink jet recording head unit 2, or a carriage.

In this embodiment, although the ink jet recording apparatus is used to describe an example of the liquid-ejecting apparatus, embodiments of the invention may be widely applied to any type of liquid-ejecting apparatus including a liquid-ejecting head. Embodiments of the invention may be obviously applied to liquid-ejecting apparatuses including a liquid-ejecting head from which a liquid other than ink is ejected. Examples of such a liquid-ejecting head include various types of recording heads which are used for image-recording apparatuses such as a printer; color material-ejecting heads used for producing a color filter of a liquid crystal display or the like; electrode material-ejecting head used for forming an electrode of an organic electroluminescent (EL) display, field emission display (FED), or the like; and bioorganic material-ejecting heads used for producing a biochip.

What is claimed is:

1. A liquid-ejecting head comprising:

a nozzle plate having [a] nozzle opening that serves for liquid ejection;

a channel-forming substrate including pressure-generating chambers that are in communication with the nozzle [opening] *openings*;

*a common liquid chamber in communication with the pressure-generating chambers in common;* a pressure generator that serves to generate pressure change in liquid in the pressure-generating chambers, *the pressure-generating chambers being downstream of the common liquid chamber*; and a communication plate disposed between the nozzle plate and the channel-forming substrate, the communication plate having [a] communication [channel] *channels* and [a] circulation [channel] *communication channels* in fluid communication with the communication [channel] *channels* within the communication plate separate from the channel-forming substrate containing the pressure-generating chambers, *the communication channels and the circulation communication channels being downstream of the pressure-generating chambers*; wherein the communication [channel forms] *channels form* a communication between the pressure-generating chambers and the nozzle [opening] *openings*;

the circulation [channel forms a communication between the communication channel and a] *communication channels are configured to flow the liquid received from the common liquid chambers, and that flows through the pressure-generating chambers and the communication channels, to a circulation channel downstream of the circulation communication channels, the circulation channel being configured to circulate the liquid back to the* common liquid chamber[, and the common liquid chamber is in communication with a plurality of the pressure-generating chambers in common].

2. The liquid-ejecting head according to claim 1, wherein, the channel-forming substrate has at least two lines of the pressure-generating chambers aligned in parallel, and the circulation channel serves as a liquid chamber that is in communication with each of the two lines of the pressure-generating chambers.

3. The liquid-ejecting head according to claim 1, wherein, the channel-forming substrate has a plurality of lines of the pressure-generating chambers aligned in parallel, and the individual lines of the pressure-generating chambers are independently in communication with the corresponding circulation channels.

4. The liquid-ejecting head according to claim 1, wherein, the channel-forming substrate has an expansion portion that is in combination with the circulation channel to increase the cross-sectional area of the circulation channel.

5. The liquid-ejecting head according to claim 1, wherein, the circulation channel is positioned so as to overlap the pressure-generating chamber in a direction in which the channel-forming substrate and the communication plate are stacked.

6. The liquid-ejecting head according to claim 1, wherein, the circulation channel has a narrow portion including a first wall and a second wall, the first wall tilting with respect to a flow direction in which a liquid circulates from the pressure-generating chamber to the common liquid chamber and serving to gradually decrease the cross-sectional area of the circulation channel toward the downstream side, the second wall tilting with respect to the flow direction and serving to gradually increase the cross-sectional area that has been gradually decreased by the first wall, wherein the tilt angle of the first wall with respect to the inner surface of the circulation channel at the upstream side relative to the first wall is larger than the tilt angle of the second wall with respect to the inner surface of the circulation channel at the downstream side relative to the second wall.

7. The liquid-ejecting head according to claim 6, wherein, a plurality of the narrow portions are provided.

8. The liquid-ejecting head according to claim 6, wherein, the first wall has a curved surface.

9. The liquid-ejecting head of claim 1, wherein the communication plate has a plurality of communication channels, each communication channel of the plurality of communication channels communicating between one pressure-generating chamber of a plurality of pressure-generating chambers and one nozzle opening of a plurality of nozzle openings.

10. The liquid-ejecting head of claim 1, wherein the communication plate has a common circulation channel that is in communication with the common liquid chamber through a plurality of communication channels and a plurality of circulation communication channels, each circulation communication channel communicating with a communication channel of the plurality of communication channels, providing fluid communication between the communication channel and the circulation channel, and being open toward the nozzle plate.

11. The liquid-ejecting head of claim 1, wherein the circulation channel including a first side wall and a second side wall opposite the first side wall, a first narrow portion extending from the first side wall and a second narrow portion extending from the second side wall, the first narrow portion extending transverse to a direction of liquid flow through the circulation channel in a direction opposite to that of the second narrow portion.

12. The liquid-ejecting head of claim 1, wherein the communication plate has a plurality of communication channels spaced apart from each other in a first direction and an elongate circulation channel extending along the communication plate in the first direction and being in fluid communication with each communication channel through a circulation communication channel formed in the communication plate.

13. The liquid-ejecting apparatus according to claim 1, wherein the liquid in the circulation channel is circulated to the communication channel via a pump.

14. A liquid-ejecting apparatus comprising:

a body; and a liquid-ejecting head, the liquid-ejecting head comprising:

a nozzle plate having [a] nozzle [opening] *openings* that serves for liquid ejection;

a channel-forming substrate including pressure-generating chambers that are in communication with the nozzle [opening] *openings*;

*a common liquid chamber in communication with the pressure-generating chambers in common;* a pressure generator that serves to generate pressure change in liquid in the pressure-generating chambers, *the pressure-generating chambers being downstream of the common liquid chamber*; and a communication plate disposed between the nozzle plate and the channel-forming substrate, the communication plate having [a] communication [channel] *channels* and [a] circulation [channel] *communication channels* in fluid communication with the communication [channel] *channels* within the communication plate separate from the channel-forming substrate containing the pressure-generating chambers, *the communication channels and the circulation communication channels being downstream of the pressure-generating chambers*; wherein the communication [channel forms] *channels form* a communication between the pressure-generating chambers and the nozzle [opening] *openings*;

the circulation [channel forms a communication between the communication channel and a] *communication channels are configured to flow the liquid received from the common liquid chambers, and that flows through the pressure-generating chambers and the communication channels, to a circulation channel downstream of the circulation communication channels, the circulation channel being configured to circulate the liquid back to the* common liquid chamber[, the common liquid chamber is in communication with a plurality of the pressure-generating chambers in common].

15. The liquid-ejecting apparatus according to claim 14, wherein, the channel-forming substrate has at least two lines of the pressure-generating chambers aligned in parallel, and the circulation channel serves as a liquid chamber that is in communication with each of the two lines of the pressure-generating chambers.

16. The liquid-ejecting apparatus according to claim 14, wherein, the channel-forming substrate has a plurality of lines of the pressure-generating chambers aligned in parallel, and the individual lines of the pressure-generating chambers are independently in communication with the corresponding circulation channels.

17. The liquid-ejecting apparatus according to claim 14, wherein, the channel-forming substrate has an expansion portion that is in combination with the circulation channel to increase the cross-sectional area of the circulation channel.

18. The liquid-ejecting apparatus according to claim 14, wherein, the circulation channel is positioned so as to overlap the pressure-generating chamber in a direction in which the channel-forming substrate and the communication plate are stacked.

19. The liquid-ejecting apparatus according to claim 14, wherein, the circulation channel has a narrow portion including a first wall and a second wall, the first wall tilting with respect to a flow direction in which a liquid circulates from the pressure-generating chamber to the common liquid chamber and serving to gradually decrease the cross-sectional area of the circulation channel toward the downstream side, the second wall tilting with respect to the flow direction and serving to gradually increase the cross-sectional area that has been gradually decreased by the first wall, wherein the tilt angle of the first wall with respect to the inner surface of the circulation channel at the upstream side relative to the first wall is larger than the tilt angle of the second wall with respect to the inner surface of the circulation channel at the downstream side relative to the second wall.

20. The liquid-ejecting apparatus according to claim 19, wherein, a plurality of the narrow portions are provided.

21. The liquid-ejecting apparatus according to claim 19, wherein, the first wall has a curved surface.

*22. A liquid-ejecting head comprising:*

*a nozzle plate having nozzle openings, wherein liquid is ejected through the nozzle openings;*

*a channel-forming substrate that includes pressure-generating chambers, wherein each of the pressure-generating chamber is in communication with one of the nozzle openings;*

*a common liquid chamber, wherein the liquid is delivered from the common liquid chamber to the pressure-generating chambers, the pressure-generating chambers being downstream of the common liquid chamber;*

*a communication plate includes:*

*communication channels, wherein each of the communication channels forms a communication between one of the pressure-generating chambers and one of the nozzle openings; and*

*a circulation channel, wherein ink entering the circulation channel is circulated back to the common liquid chamber; and*

*circulation communication channels that place the communication channels in fluid communication with the circulation channel to circulate a portion of the liquid from the nozzle opening to the circulation channel, the communication channels and the circulation communication channels being downstream of the pressure-generating chambers, each circulation communication channel being within the communication plate separate from the channel-forming substrate containing the pressure-generating chambers,*

*wherein, the circulation communication channels are configured to flow the liquid received from the liquid from the common liquid chambers, and that flows through the pressure-generating chambers and the communication channels, to the circulation channel downstream of the circulation communication channels, the circulation channel being configured to circulate the liquid back to the common liquid chamber.*

*23. The liquid-ejecting head of claim 22, wherein the circulation communication channel comprises a first wall formed in the nozzle plate and a second wall formed in the communication plate.*

*24. The liquid-ejecting head of claim 23, wherein the first wall faces the second wall.*

*25. A liquid-ejecting head comprising:*

*a nozzle plate that includes nozzle openings, wherein liquid is ejected through the nozzle openings;*

*a channel-forming substrate that includes pressure-generating chambers that are in communication with the nozzle openings;*

*a common liquid chamber, wherein the liquid is delivered from the common liquid chamber to the pressure-generating chambers, the pressure-generating chambers being downstream of the common liquid chamber; and*

*a communication plate includes:*

*communication channels that form a communication between the pressure-generating chambers and the nozzle openings;*

*circulation communication channels in fluid communication with the communication channels within the communication plate separate from the channel-forming substrate containing the pressure-generating chambers, the communication channels and the circulation communication channels being downstream of the pressure-generating chambers; and*

*a circulation channel;*

*wherein the communication plate and the nozzle plate cooperate to form the circulation communication channels between the communication channels and the circulation channel,*

*wherein, the circulation communication channels are configured to flow the liquid received from the liquid from the common liquid chambers, and that flows through the pressure-generating chambers and the communication channels, to the circulation channel downstream of the circulation communication channel, the circulation channel being configured to circulate the liquid back to the common liquid chamber.*

*26. The liquid-ejecting head of claim 25, wherein the fluid communication comprises a circulation communication channel comprises a first wall formed in the nozzle plate and a second wall formed in the communication plate.*

*27. The liquid ejecting head of claim 26, wherein the first wall faces the second wall.*

*28. A liquid-ejecting head comprising:*

*a nozzle plate having nozzle openings, wherein liquid is ejected through the nozzle openings;*

*a channel-forming substrate that includes pressure-generating chambers, wherein each of the pressure-generating chamber is in communication with one of the nozzle openings;*

*a common liquid chamber, wherein the liquid is delivered from the common liquid chamber to the pressure-generating chambers, the pressure-generating chambers being downstream of the common liquid chamber; and*

*a communication plate includes:*

*communication channels that forms a communication between the pressure-generating chambers and the nozzle openings;*

*circulation communication channels in fluid communication with the communication channels within the communication plate separate from the channel-forming substrate containing the pressure-generating chambers, the communication channels and the circulation communication channels being downstream of the pressure-generating chambers; and*

*a circulation channel;*

*wherein the communication plate and the nozzle plate cooperate to form the circulation communication channels between the communication channel and the circulation channel, and*

*wherein, the circulation communication channels are configured to flow the liquid received from the liquid from the common liquid chambers, and that flows through the pressure-generating chambers and the communication channels, to the circulation channel downstream of the circulation communication channel, the circulation channel being configured to circulate the liquid back to the common liquid chamber.*

*29. The liquid-ejecting head of claim 28, wherein the circulation communication channel comprises a first wall formed in the nozzle plate and a second wall formed in the communication plate.*

*30. The liquid-ejecting head of claim 29, wherein the first wall faces the second wall.*

* * * * *